June 3, 1958  A. W. GAUBATZ  2,836,987
MECHANICAL DISCRIMINATING DEVICE
Filed Sept. 1, 1954  3 Sheets-Sheet 1

INVENTOR
Arthur W. Gaubatz
BY
Paul J. Fitzpatrick
ATTORNEY

June 3, 1958 A. W. GAUBATZ 2,836,987
MECHANICAL DISCRIMINATING DEVICE
Filed Sept. 1, 1954 3 Sheets-Sheet 2

INVENTOR
Arthur W. Gaubatz
BY
Paul Fitzpatrick
ATTORNEY

June 3, 1958　　　　A. W. GAUBATZ　　　　2,836,987
MECHANICAL DISCRIMINATING DEVICE

Filed Sept. 1, 1954　　　　　　　　　　　3 Sheets-Sheet 3

INVENTOR
Arthur W. Gaubatz
BY Paul Fitzpatrick
ATTORNEY

United States Patent Office 2,836,987
Patented June 3, 1958

2,836,987

MECHANICAL DISCRIMINATING DEVICE

Arthur W. Gaubatz, Indianapolis, Ind., assignor to General Motors Corporation, Detroit, Mich., a corporation of Delaware Application September 1, 1954, Serial No. 453,670

4 Claims. (Cl. 74—479)

This invention is directed to devices which I call discriminators and is a development of the discriminator device claimed in my copending application Serial No. 254,142, filed October 31, 1951 (now Patent No. 2,778,241) of which this application is a continuation-in-part. The purpose of the device is to transmit movement from either of two driving devices to a driven device in such manner that the driven device will move with whichever of the driving devices is farthest advanced from a datum position. One field of use of the invention is to provide for normal operation or control of the driven member by one of the driving members but to provide overriding control by the second one of the driving members whenever it is advanced beyond the position of the first driving member. The invention permits either driving member to be advanced freely, independently of the position of the other driving member.

The principal objects of the invention are to provide a device by which a driven device may be actuated by either of two driving devices, being coupled to the driving device which is farthest advanced from a datum position, and to provide a device of this character which is simple and reliable.

A more immediate object of the invention lies in the improvement of control systems, such as control systems for aircraft power plants. Since the utility of the invention of this application is not restricted to such a system, the discriminator device is described herein without detailed description of any particular application thereof.

The nature and advantages of the invention and the preferred manner in which the stated objects are realized will be clear from the succeeding detailed description of the preferred embodiment of the invention and the accompanying drawings, in which—

Figure 1:
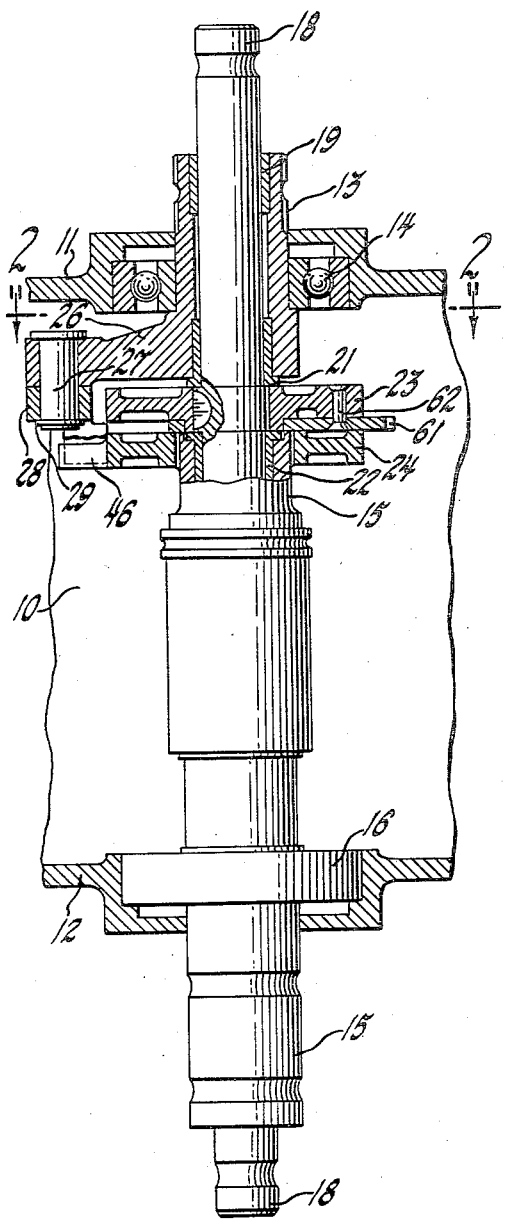
Fig. 1 is a sectional view of a portion of a control device embodying the invention.

Referring first to Fig. 1, the control device partially illustrated therein, which may be part of the controls of an aircraft power plant, comprises a case 10 including end plates 11 and 12. An output shaft 13 which is adapted for connection to a control arm or the like is rotatably mounted by a bearing 14 in the end plate 11. A first input shaft 15 which is coaxial with shaft 13 is rotatably mounted in a bearing 16 in the end plate 12. A second input shaft 18 extends through the interior of shafts 13 and 15 and out at both ends. Shaft 18 may be mounted in anti-friction bushings in the shafts 13 and 15 such as bushings 19 and 21 in shaft 13, and bushing 22 in shaft 15, and thus serves to maintain the alignment of shafts 15 and 18. The ends of shafts 15 and 18 are also adapted for the mounting of motion transmitting arms. A driving disk or cam 23 is keyed on the shaft 18 between the adjacent ends of shafts 13 and 15 and a similar driving disk 24 is fixed on the inner end of shaft 15. For convenience in further reference, the disk 23 will be called the front disk and disk 24 the rear disk, this nomenclature being responsive to their relation to the device driven thereby, which comprises an arm 26 integral with the shaft 13 and extending radially therefrom adjacent front disk 23. A pin 27 mounted in arm 26 serves as a pivot or fulcrum for a coupling member 28 which is secured thereon by a snap ring 29. Coupling member 28 is actuated by disks 23 and 24 so that it is coupled with whichever disk is farthest moved ahead from a predetermined datum position and is held so engaged by the other disk. As will be seen from the foregoing description, the device of this application is similar in purpose and to some extent in structure to that of the above-mentioned copending application. However, the structure of the disks and the coupling member by which the action referred to above is obtained is different and gives rise to smoother operation as well as being a more readily fabricated structure.

The coupling member comprises two similar arms which terminate in coupling portions 33 and 34 cooperating with the disks 23 and 24, respectively. As will be apparent, these coupling portions are somewhat cylindrical in outline as viewed along the axis of rotation of the shafts. Disk 23 has a notch 35 in its periphery and disk 24 has a similar notch 36. Clockwise from the notches, the disks have peripheral surfaces 37 and 38, respectively, which are concentric with the axis.

Figure 7:
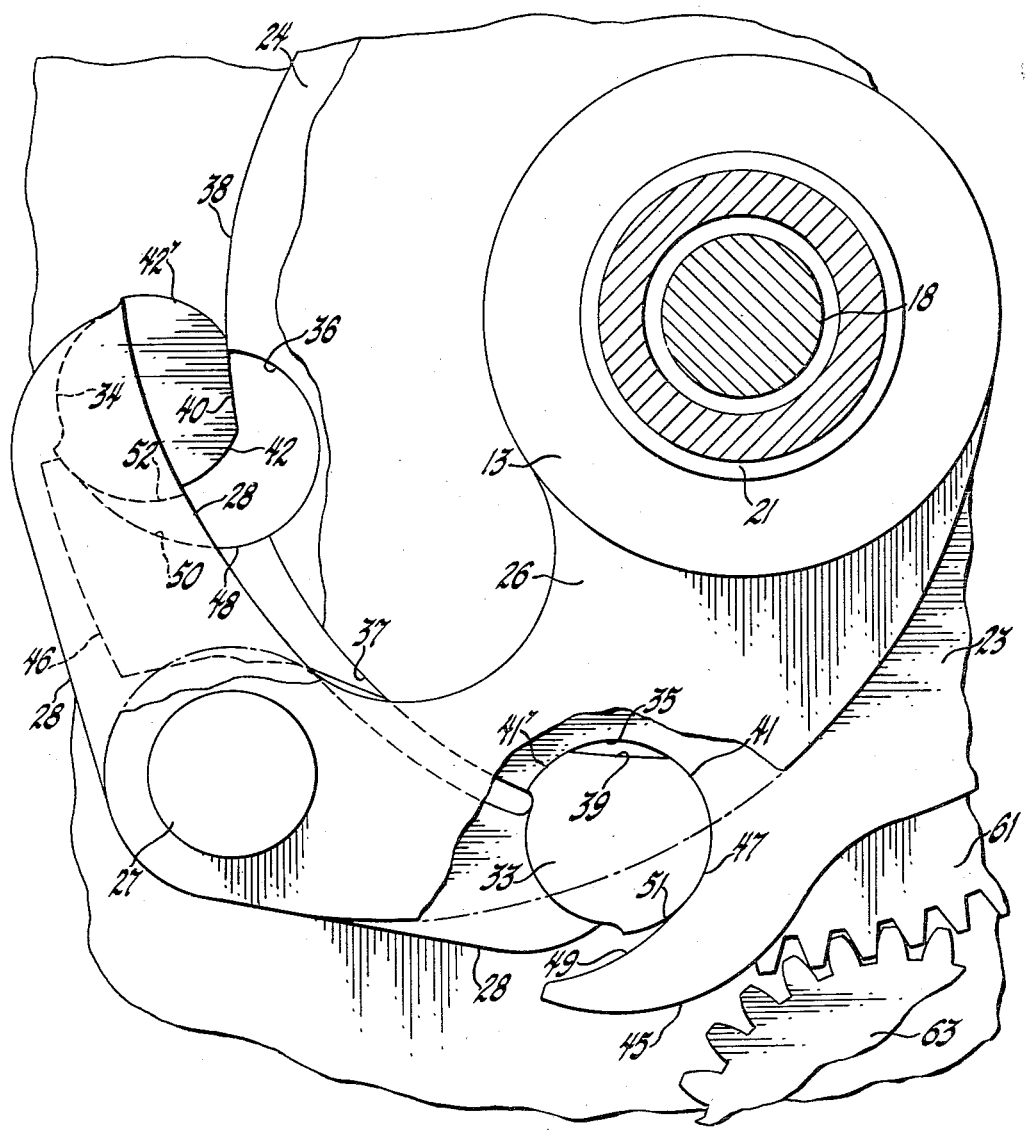
Fig. 7 is a greatly enlarged partial view to show the contours of the parts more clearly.

In the normal operation of the discriminator, one coupling portion is engaged in the notch of the corresponding disk and the other coupling portion is riding on the cylindrical surface 37 or 38 of the other disk. As shown in Fig. 7, coupling portion 33 is in notch 35 of front disk 23 and coupling portion 34 which engages the rear disk 24 is riding on the surface 38. Thus, the coupling portion 33 positively couples shafts 18 and 13 when the device is in the condition shown in Fig. 7, and the engagement of coupling portion 34 with the periphery of rear disk 24 maintains this engagement.

The coupling portions have arcuate surfaces 39 and 40 which are concentric with the peripheries of the cams and provide a shoe to ride over the surfaces 37 and 38 of the cams. The cylindrical surface portions 41 and 41' of coupling portion 33 and 42 and 42' of coupling portion 34 are adapted to engage the substantially semicylindrical surface of the notches 35 and 36 and the radii of these cylindrical surface portions are equal, except that sufficient clearance is provided to enable the parts to work smoothly. Each cam is provided with a projection 45 and 46, respectively, which lies abreast of or over the counterclockwise portion of the notch. A part of the inner surface portion of these projections, approximately to the points identified as 47 and 48 in the figure is of the same radius the notch 35. Outward of that point, the surface 49 or 50 is of greater radius of curvature and this surface is adapted to engage an outer cylindrical portion 51 or 52 of the coupling portion. As illustrated in Fig. 7, the surface 52 of coupling portion 34 is just at the point of engaging the outer end of the cam surface 50.

The surface 49 or 50 acts to cam the corresponding coupling portion into the notch 35 or 36 upon clockwise rotation of the cam 23 or 24 relative to the arm 28.

Thus, if either of the cam disks is moved ahead of the other relatively to a datum position, the coupling member is shifted into coupled relation with whichever disk is farthest ahead and is positively coupled thereto for transmission of motion in both directions. Meanwhile, the other disk which is not coupled will move freely, but will take over control whenever it is advanced or the other is retracted so that the other disk becomes the one farthest advanced.

Figure 2:
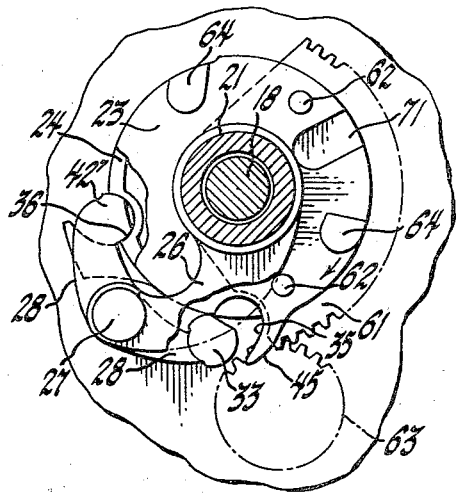
Fig. 2 is a cross-sectional view of the discriminator taken on the plane indicated in Fig. 1.
Figure 3:
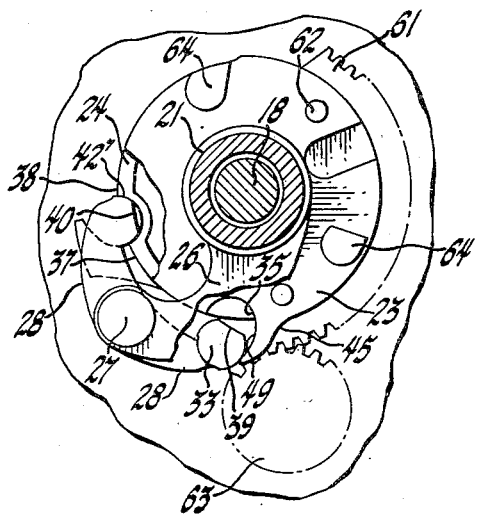
Fig. 3 is a view similar to Fig. 2 with the parts in a different position.
Figure 4:
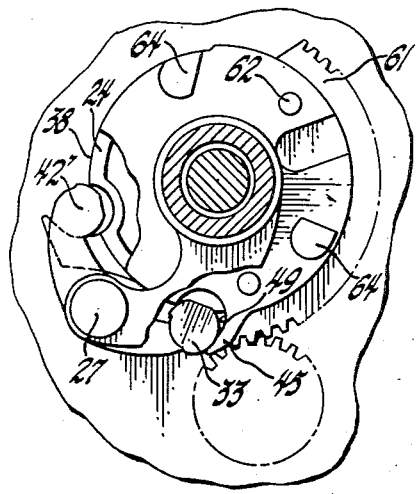
Fig. 4 is a view similar to Fig. 2 showing further movement of the parts.
Figure 5:
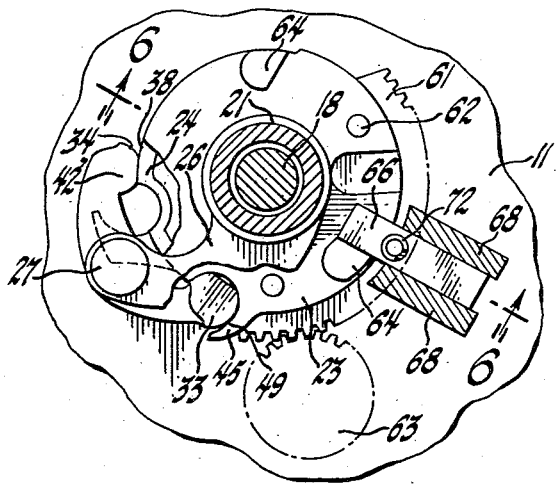
Fig. 5 is a view similar to Fig. 2 showing still further movement of the parts.

Referring now to Figs. 2, 3, 4, and 5, these show the sequence of operation by which control of the output shaft 13 is taken over by one driving cam from the other. Fig. 2 shows the output under control of the rear cam 24. In the succeeding views the front cam 23 moves progressively clockwise, and the coupling member is released from the rear cam and engaged in the notch of the front cam, the transition being complete in Fig. 5. It will be apparent from these figures how surface 49 of projection 45 of the front cam 23 rotates the coupling member 28 about its fulcrum 27, thus forcing the coupling portion 33 into the notch 35. In Fig. 3 the surface 49 engages the coupling portion 33 and in Fig. 4 the transition is about half accomplished. In Fig. 5 it is complete, with the coupling portion 34 riding on the cylindrical surface 38 of the rear cam 24. As will be apparent, if the front cam remains in the position in which it is shown in Fig. 5 and the rear cam 24 moves ahead, the sequence of operations will be reversed and the rear cam will be coupled to the output shaft 13.

Figure 6:
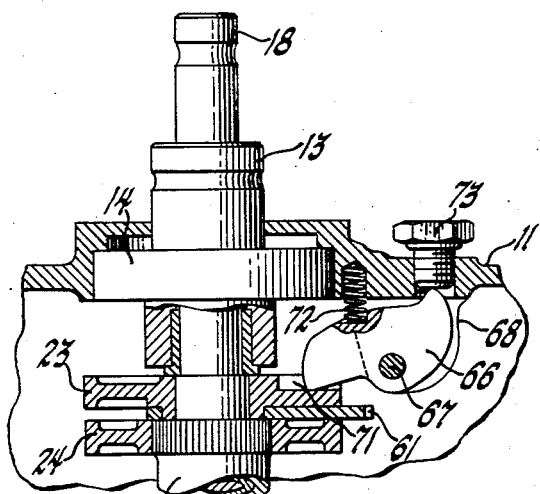
Fig. 6 is a fragmentary view taken on the plane indicated in Fig. 5.

Certain additional features of the machine should be mentioned. A gear sector 61 secured to the front cam disk 23 by rivets 62 serves to furnish an input to mechanism within the control device indicated by the broken line pinion 63. Lugs 64 extending from the outer face of front cam 23 serve as stops to limits its movement. These lugs engage a stop member 66 rotatably mounted on a pin 67 fixed in a clevis 68 extending from the end cover 11 of the case. A slot 71 in the face of disk 23 cooperates with the stop 66 to fix a known position of the disk 23 for alignment of the mechanism. The stop 66 is urged into the slot 71 by compression spring 72 so that, if the screw 73 in the cover plate is backed off as shown in Fig. 6 and the cam is rotated, the stop member will enter the slot and serve as a latch to hold the cam in the particular position. For normal operation, the screw 73 is driven home and holds the stop member out of the notch but in position to engage the stop lugs 64. The stop member is shown in engagement with one of the lugs in Fig. 5.

The preferred embodiment of the invention has been described herein for the purpose of explaining the principles thereof and not by way of limitation, as it will be apparent that many modifications of structure within the scope of the invention may be made by the exercise of skill in the art.

I claim:

1. A discriminator device comprising, in combination, a support, three parts movably mounted on the support for parallel movement, two of the parts being driving parts and one being a driven part, similar cams on the driving parts, and a coupling member rockably mounted on the driven part adjacent the periphery of the cam for rotation about an axis normal to the direction of movement of the parts, the coupling member having two arms terminating in coupling portions cooperating respectively with the surfaces of the two cams, the cams having notches adapted to receive the coupling portions, the cams also having extended surfaces paralleling the direction of movement thereof, one coupling portion being adapted to ride on the said surface of one cam while the other portion is lodged in the notch of the other cam, and each cam including a surface overlying the notch therein adapted to engage the corresponding coupling portion to cam it into the notch thereof upon relative movement of the cam and the said other cam.

2. A discriminator device comprising, in combination, a support, three coaxial shafts rotatably mounted in the support, two of the shafts being driving shafts and one being a driven shaft, similar cams on the driving shafts, an arm extending from the driven shaft, and a coupling member rockably mounted on the arm adjacent the cams for rotation relative to the arm about an axis parallel to the axis of the shafts, the coupling member having two arms terminating in coupling portions cooperating respectively with the two cams, the cams having notches adapted to receive the coupling portions, the cams also having surfaces centered on the axis of the shafts, one coupling portion being adapted to ride against the said surface of one cam while the other coupling portion is lodged in the notch of the other cam, and each cam including a surface overlying the notch therein adapted to engage the corresponding coupling portion to cam it into the notch thereof upon relative rotation of the cam and the other cam.

3. A discriminator device comprising, in combination, a support, three coaxial shafts rotatably mounted on the support, two of the shafts being driving shafts and one being a driven shaft, similar cams on the driving shafts, an arm extending from the driven shaft, and a coupling member rockably mounted on the arm adjacent the periphery of the cams for rotation relative to the arm about an axis parallel to the axis of the shafts, the coupling member having two arms terminating in coupling portions cooperating respectively with the peripheries of the two cams, the cams having notches adapted to receive the coupling portions, the cams also having surfaces centered on the axis of the shafts, one coupling portion being adapted to ride on the said surface of one cam while the other coupling portion is lodged in the notch of the other cam, and each cam including a surface located radially outward from the notch therein adapted to engage the corresponding coupling portion to cam it into the notch thereof upon relative rotation of the cam and the other cam.

4. A discriminator device comprising, in combination, a support, three coaxial shafts rotatably mounted on the support, two of the shafts being driving shafts and one being a driven shaft, similar cams on the driving shafts, an arm extending from the driven shaft, and a coupling member rockably mounted on the arm adjacent the periphery of the cams for rotation relative to the arm about an axis parallel to the axis of the shafts, the coupling member having two arms terminating in coupling portions cooperating respectively with the peripheries of the two cams, the coupling portions having generally cylindrical surfaces and the cams having generally semi-cylindrical notches adapted to receive the coupling portions, the cams also having surfaces centered on the axis of the shafts, one coupling portion being adapted to ride on the said surface of one cam while the other coupling portion is lodged in the notch of the other cam, each coupling portion including a surface conforming to the said centered surface of the cam when the coupling portion is riding on the said surface disposed between portions of the aforementioned cylindrical surface, the portions of the cylindrical surface being contoured to conform to the surface of the notch in the cam, and each cam including an arcuate generally quadrantal surface located radially outward from the notch therein adapted to engage the corresponding coupling portion to cam it into the notch thereof upon relative rotation of the cam and the other cam.

(References on following page)

References Cited in the file of this patent

UNITED STATES PATENTS

| | | |
|---|---|---|
| 2,634,670 | Simons | Apr. 14, 1953 |
| 2,778,241 | Gaubatz | Jan. 22, 1957 |

FOREIGN PATENTS

| | | |
|---|---|---|
| 203,005 | Great Britain | Sept. 6, 1923 |
| 436,652 | Great Britain | Oct. 16, 1935 |
| 733,384 | Germany | Mar. 25, 1943 |

OTHER REFERENCES

Abstract in Great Britain specification Abridgements, Class 80 (III), "Linkworks," Period 1921–1925, page 106.